United States Patent [19]

Sybert et al.

[11] Patent Number: 5,387,639
[45] Date of Patent: Feb. 7, 1995

[54] DUCTILE BLENDS OF POLYESTER-CARBONATE OR POLYARYLATES AND POLYETHERIMIDE RESINS

[75] Inventors: Paul D. Sybert, Evansville; Raymond H. Glaser, Mt. Vernon, both of Ind.

[73] Assignee: General Electric Company, Pittsfield, Mass.

[21] Appl. No.: 965,646

[22] Filed: Oct. 23, 1992

[51] Int. Cl.$^6$ .............. C08L 69/00; C08L 71/10; C08L 67/03
[52] U.S. Cl. .................. 524/537; 525/425; 525/433; 525/436; 524/538; 524/539; 524/605
[58] Field of Search ............ 524/538, 537, 539, 605; 525/425, 433, 436

[56] References Cited

U.S. PATENT DOCUMENTS

| | | | |
|---|---|---|---|
| 4,141,927 | 2/1979 | White et al. | 525/436 |
| 4,250,279 | 2/1981 | Robeson et al. | 525/433 |
| 4,430,484 | 2/1984 | Quinn | 525/425 |
| 4,468,506 | 8/1984 | Holub et al. | 525/436 |
| 4,548,997 | 10/1985 | Mellinger et al. | 525/433 |
| 4,687,819 | 8/1987 | Quinn et al. | 525/425 |
| 4,772,653 | 9/1988 | McKenna | 525/132 |
| 4,814,396 | 3/1989 | Liu | 525/433 |
| 4,816,527 | 3/1989 | Rock | 525/433 |
| 4,820,781 | 4/1989 | Policastro et al. | 525/436 |
| 4,835,047 | 5/1989 | Isayer et al. | 525/436 |
| 4,908,418 | 3/1990 | Holub | 525/425 |
| 4,908,419 | 3/1990 | Holub et al. | 525/425 |
| 5,051,483 | 9/1991 | Rock et al. | 525/425 |
| 5,106,915 | 4/1992 | Rock et al. | 525/436 |

FOREIGN PATENT DOCUMENTS

| | | | |
|---|---|---|---|
| 0033011 | 2/1981 | European Pat. Off. | |
| 0117327 | 9/1984 | European Pat. Off. | |
| 0158733 | 9/1985 | European Pat. Off. | |
| 0186927 | 7/1986 | European Pat. Off. | 525/433 |
| 0187416 | 8/1987 | European Pat. Off. | |
| 0256761 | 4/1988 | European Pat. Off. | |
| 0519657 | 7/1993 | European Pat. Off. | |
| 0001758 | 1/1989 | Japan | 525/425 |

*Primary Examiner*—Peter Szekely

[57] ABSTRACT

Blends of polyester-carbonates and/or polyarylate resins with polyetherimide resins are thermoplastically molded to obtain ductile, high distortion temperature articles. The polyester-carbonate resin or polyarylate resin is selected from a particular class prepared by polymerization of a dihydric phenol, and an ester precursor which is terephthalic acid, optionally with a proportion of isophthalic acid.

8 Claims, No Drawings

DUCTILE BLENDS OF POLYESTER-CARBONATE OR POLYARYLATES AND POLYETHERIMIDE RESINS

BACKGROUND OF THE INVENTION

1. Field of The Invention

The invention relates to thermoplastic molding compositions and more particularly to molding compositions which are blends of polyester-carbonate and polyetherimide resins.

2. Brief Description of the Related Art

Polyester-carbonates (also known as copolyester-polycarbonates) are a well known class of thermoplastic resin as is their preparation; see for example the descriptions given in U.S. Pat. Nos. 3,169,121 and 4,487,896.

Polyester-carbonate (PPC) resins have been useful as ingredients in blends of thermoplastic molding resins, to mold particular articles of certain physical properties. For example, U.S. Pat. No. 4,430,484 (Quinn) issued Feb. 7, 1984, describes blends of polyester-carbonates with polyetherimides as useful to mold articles showing improved, higher heat distortion temperature under load. However, articles molded from the exemplified blends exhibit some brittleness when subjected to testing for notched Izod impact strengths.

In copending U.S. patent application Ser. No. 716,940 assigned to the assignee of interest of the present application and filed Jun. 18, 1991 abandoned, ternary blends of polyetherimides, siloxane polyetherimide copolymers and polycarbonate resins including polyester-carbonate resins are described broadly as thermoplastically moldable to obtain ductile articles with improved flame retardance and strength properties useful in engineering thermoplastics. The disclosure however does not include actual examples of specific blend formulations containing polyester-carbonate resins, with characterization of the associated physical properties. In fact, many (but not all) blends of polyester-carbonate resins with polyetherimides and siloxane polyetherimide copolymers yield brittle (non-ductile) articles when thermoplastically molded. We have studied this puzzling situation and discovered that the ductility of polyester-carbonate resin-polyetherimide or polyarylate-polyetherimide resin blend generated articles is dependent on a plurality of factors not previously appreciated.

First, we have discovered that the average ester content of the total blend composition is critical to the achievement of ductility in articles molded from polyester-carbonate resins or polyarylate resins blended with polyetherimide, alone or with siloxane-polyetherimides.

Second, we have discovered that articles thermoplastically molded from blends of polyester-carbonate and polyetherimide resins with or without the presence of a siloxane-polyetherimide copolymer can exhibit both ductility and high heat distortion temperature under load, when the polyester-carbonate resin ingredient is selected from a particular class of resins, characterized by a particular chain structure. The improved articles (in respect to ductility) are useful for example, as interior body components of automobiles, aircraft and like vehicles. The high heat distortion under load values are particularly useful in the thermoforming of laminate panels.

SUMMARY OF THE INVENTION

The invention comprises, a thermoplastic molding composition, for molding ductile articles, which comprises; a blend of (a) from about 0 to 95 (preferably 75 to 90) parts by weight of a polyester-carbonate resin containing recurring polycarbonate chain units of the formula:

wherein D is a divalent aromatic radical of the dihydric phenol employed in the resin preparation; and repeating or recurring carboxylic chain units of the formula:

wherein D has the meaning previously ascribed to it and R is a divalent moiety selected from those of the formulae:

or

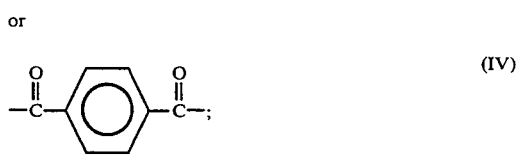

(b) from about 5 to 25 parts by weight of a polyetherimide resin having repeating chain units of the formula:

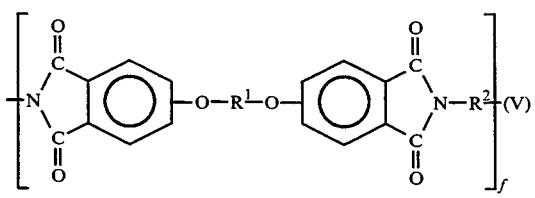

wherein f is an integer of from about 10 to about 500; $R^2$ represents a divalent aliphatic hydrocarbon radical containing from 2 to about 12 carbon atoms, a divalent aromatic hydrocarbon of 6 to 20 carbon atoms, a halogenated hydrocarbon radical containing from 6 to 18 carbon atoms, or a divalent cycloaliphatic hydrocarbon radical containing from 3 to about 10 carbon atoms; and $R^1$ is a divalent aromatic organic radical having from 6 to 30 carbon atoms inclusive; and (c) from about 0 to 95 parts (preferably 30 to 70 parts) by weight of a thermoplastic aromatic polyarylate resin having repeating chain units of the formula (II) given above;

said composition having an average of about 20 to 80 weight percent of ester units of the formulae (III) and (IV) together, preferably 40 to 80 weight percent; and said moieties (III) and (IV) in the blend being in a weight percent ratio within the range of from about 50:50 to about 0:100.

Radicals included by $R^1$ are, for example, aromatic hydrocarbon radicals and halogenated aromatic hydrocarbon radicals, for example, phenylene, tolylene, chlorophenylene, naphthalene, and radicals of the formula:

$$-R^3-(G)_g-R^3- \quad \text{(VI)}$$

wherein $R^3$ is a divalent radical having from 6-13 carbon atoms, inclusive, selected from hydrocarbon radicals and halogenated hydrocarbon radicals; g is an integer of 0 to 1; and G is a divalent radical selected from those of formula:

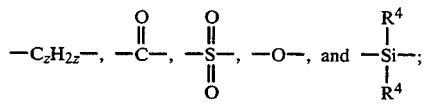

wherein z is an integer of from 1-5, inclusive, and $R^4$ is a monovalent alkyl, aryl, alkaryl or aralkyl radical, preferably selected from methyl and phenyl.

The term "blend" as used herein means a physical mixture or alloy of the prescribed polymeric components.

The compositions of the invention are useful to thermoplastically mold articles such as structural panels and the like.

DETAILED DESCRIPTION OF THE PREFERRED EMBODIMENTS OF THE INVENTION

The polyester-carbonates used as ingredient (a) in the blends of the invention may be prepared by interfacial polymerization technique, well known to those skilled in the art; see for example the U.S. Pat. Nos. 3,169,121 and 4,487,896 which are incorporated herein by reference thereto.

In general, the method of interfacial polymerization comprises the reaction of a dihydric phenol with a carbonyl halide (the carbonate precursor) in the presence of a dicarboxylic acid (ester precursor).

Although the reaction conditions of the preparative processes may vary, several of the preferred processes typically involve dissolving or dispersing the diphenol reactants in aqueous caustic, adding the resulting mixture to a suitable water immiscible solvent medium and contacting the reactants with the carbonate precursor, such as phosgene, in the presence of a suitable catalyst and under controlled pH conditions. The most commonly used water immiscible solvents include methylene chloride, 1,2-dichloroethane, chlorobenzene, toluene, and the like.

Advantageously a catalyst is added to the reaction mixture to promote the reaction. The catalyst employed accelerates the rate of polymerization of the dihydric phenol reactant with the carbonate precursor. Representative catalysts include but are not limited to tertiary amines such as triethylamine, quaternary phosphonium compounds, quaternary ammonium compounds, and the like.

The preferred process for preparing polycarbonate resins comprises a phosgenation reaction. The temperature at which the phosgenation reaction proceeds may vary from below 0° C., to above 100° C. The phosgenation reaction preferably proceeds at temperatures of from about room temperatures (25° C.) to 50° C. Since the reaction is exothermic, the rate of phosgene addition may be used to control the reaction temperature. The amount of phosgene required will generally depend upon the amount of the dihydric phenols reactant added.

The dihydric phenols employed are known, and the reactive groups are the two phenolic hydroxyl groups. Some of the dihydric phenols are represented by the general formula:

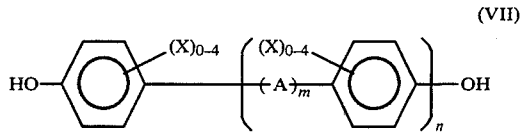

wherein A is a divalent hydrocarbon radical containing from 1 to about 15 carbon atoms; a substituted divalent hydrocarbon radical containing from 1 to about 15 carbon atoms and substituent groups such as halogen; $-S-$; $-SS-$; $-S(O)-$; $-S(O)_2-$; $-O-$; or $-C(O)-$; each X is independently selected from the group consisting of hydrogen, halogen, and a monovalent hydrocarbon radical such as an alkyl group of from 1 to about 8 carbon atoms, an aryl group of from 6-18 carbon atoms, an aralkyl group of from 7 to about 14 carbon atoms, an alkoxy group of from 7 to about 14 carbon atoms, an alkoxy group of from 1 to about 8 carbon atoms, or an aryloxy group of from 6 to 18 carbon atoms; and m is zero or 1 and n is an integer of from 0 to 5.

Typical of some of the dihydric phenols employed are bis-phenols such as (4-hydroxy-phenyl)methane, 2,2-bis(4-hydroxyphenyl)propane (also known as bisphenol-A), 2,2-bis(4-hydroxy-3,5-dibromophenyl)propane; dihydric phenol ethers such as bis(4-hydroxyphenyl) ether, bis(3,5-dichloro-4-hydroxyphenyl) ether; dihydroxydiphenyls such as p,p'-dihydroxydiphenyl, 3,3'-dichloro-4,4'-dihydroxydiphenyl; dihydroxyaryl sulfones such as bis(4-hydroxyphenyl) sulfone, bis (3,5-dimethyl-4-hydroxyphenyl) sulfone, dihydroxybenzenes such as resorcinol, hydroquinone, halo- and alkyl-substituted dihydroxybenzenes such as 1,4-dihydroxy-2,5-dichlorobenzene, 1,4-dihydroxy-3-methylbenzene; and dihydroxydiphenyl sulfides and sulfoxides such as bis(4-hydroxyphenyl) sulfide, bis(4-hydroxyphenyl) sulfoxide and bis(3,5-dibromo-4-hydroxyphenyl) sulfoxide. A variety of additional dihydric phenols are available and are disclosed in U.S. Pat. Nos. 2,999,835; 3,028,365 and 3,153,008; all of which are incorporated herein by reference thereto. It is, of course, possible to employ two or more different dihydric phenols or a combination of a dihydric phenol with a glycol.

The carbonate precursor can be either a carbonyl halide, a diarylcarbonate or a bishaloformate. The carbonyl halides include carbonyl bromide, carbonyl chloride, and mixtures thereof. The bishaloformates include the bishaloformates of dihydric phenols such as bischloroformates of 2,2-bis(4-hydroxyphenyl)propane, 2,2-bis(4-hydroxy-3,5-dichlorophenyl)propane, hydroquinone, and the like, or bishaloformates of glycols such as bishaloformates of ethylene glycol, and the like. While all of the above carbonate precursors are useful, carbonyl chloride, also known as phosgene, is preferred.

In general, any dicarboxylic acid conventionally used in the preparation of linear polyesters may be utilized in the preparation of polyester-carbonate resins. However, the polyester-carbonate resins used in the present invention are prepared with aromatic dicarboxylic acids, and in particular terephthalic acid, and mixtures thereof with isophthalic acid wherein the weight ratio of terephthalic acid to isophthalic acid is in the range of from about 100:1 to about 50:50.

Rather than utilizing the dicarboxylic acid per se, it is possible, and sometimes even preferred, to employ the reactive derivatives of said acid. Illustrative of these reactive derivatives are the acid halides. The preferred acid halides are the acid dichlorides and the acid dibromides. Thus, for example instead of using terephthalic acid or mixtures thereof with isophthalic acid, it is possible to employ terephthaloyl dichloride, and mixtures thereof with isophthaloyl dichloride.

In the conventional interfacial polymerization methods of preparing polycarbonates and polyarylates, a molecular weight regulator (a chain stopper) is generally added to the reaction mixture prior to or during the contacting with a carbonate and/or ester precursors. Useful molecular weight regulators include, but are not limited to, monohydric phenols such as phenol, chroman-I, paratertiarybutylphenol, p-cumylphenol and the like. Techniques for the control of molecular weight are well known in the art and are used for controlling the molecular weight of the resins used in the blends of the present invention.

The proportions of reactants employed to prepare the polyester-carbonate resins will vary in accordance with the proposed use of the blends of the invention containing this product resin. In general, the amount of the ester units of formula (III) and (IV) may be from about 20 to about 80 weight percent, relative to the carbonate units, preferably 40 to 80 weight percent.

The preferred polyester-carbonates for use as the ingredient (a) in the blends of the present invention are those derived from reaction of bisphenol-A and phosgene and having an intrinsic viscosity of about 0.5 to about 0.65 deciliters per gram (measured in methylene chloride at a temperature of 25° C.).

The polyimide resins comprising the ingredient (b) in the blends of the invention are also known compounds whose preparation and properties are well known to those skilled in the art. For the purposes of the instant invention the polyetherimides are the preferred polyimides. The preferred polyetherimides are described in U.S. Pat. Nos. 3,803,085 and 3,905,942, both of which are incorporated herein by reference. These polyetherimides are represented by the general formula (V) given above.

Illustrative of a particularly preferred polyetherimide falling within the scope of Formula (V) is one wherein $R^2$ is phenylene and $R^1$ is the divalent moiety of formula:

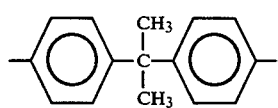

(VIII)

In general, the polyetherimides of formula (V) given above may be prepared by the reaction of an aromatic bis(ether anhydride) of the formula:

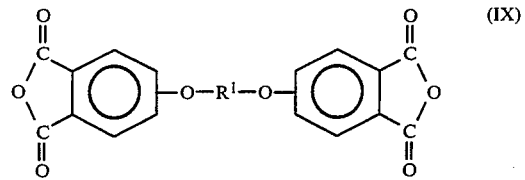

(IX)

wherein $R^1$ is as defined above, with an organic diamine of the formula:

(X)

where $R^2$ is as defined hereinbefore.

Aromatic bis(ether anhydride)s of the above formula (IX) include, for example, 2,2-bis[4-(2,3-dicarboxyphenoxy)phenyl]propane dianhydride; 4,4'-bis(2,3-dicarboxyphenoxy)diphenyl ether dianhydride; 1,3-bis(2,3-dicarboxyphenoxy)benzene dianhydride; 4,4'-bis(2,3-dicarboxyphenoxy)diphenyl sulfide dianhydride; 1,4-bis(2,3-dicarboxyphenoxy)benzene dianhydride; 4,4'-bis(2,3-dicarboxyphenoxy)benzophenone dianhydride; 4,4'-bis(2,3-dicarboxyphenoxy)diphenyl sulfone dianhydride; 2,2-bis[4-(3,4-dicarboxyphenoxy)phenyl]-propane dianhydride; 4,4'-bis(3,4-dicarboxyphenoxy)diphenyl ether dianhydride; 4,4'-bis(3,4-dicarboxyphenoxy)diphenyl sulfide dianhydride; 1,3-bis(3,4-dicarboxyphenoxy)benzene dianhydride; 1,4-bis(3,4-dicarboxyphenoxy)benzene dianhydride; 4,4'-bis(3,4-dicarboxyphenoxy)benzophenone dianhydride; 4-(2,3-dicarboxyphenoxy)-4'(3,4-dicarboxyphenoxy)diphenyl-2,2-propane dianhydride; and mixtures of such dianhydrides.

Organic diamines of the formula (X) include, for example, m-phenylenediamine, p-phenylenediamine, 4,4'-diaminodiphenyl propane, 4,4'-diaminodiphenyl methane, benzidine, 4,4'-diaminodiphenyl sulfide, 4,4'-diaminodiphenyl sulfone, 4,4'-diaminodiphenyl ether, 1,5-diaminonaphthalene, 3,3'-dimethylbenzidine, 3,3'-dimethoxybenzidine, 2,4-bis(β-amino-t-butyl) toluene, bis(p-β-amino-t-butylphenyl)ether, bis(p-β-methyl-o-aminophenyl)benzene, 1,3-diamino-4-isopropylbenzene, 1,2-bis(3-aminopropoxy)ethane, m-xylylenediamine, p-xylylenediamine, 2,4-diaminotoluene, 2,6-diaminotoluene, bis(4-aminocyclohexyl)methane, 3,methylheptamethylenediamine, 4,4-dimethylheptamethylenediamine, 2,11-dodecanediamine, 2,2-dimethylpropylenediamine, octamethylenediamine, 3-methoxyhexamethylenediamine, 2,5-dimethylhexamethylenediamine, 2,5-dimethylheptamethylenediamine, 3-methylheptamethylenediamine, 5-methylnonamethylenediamine, 1,4-cyclohexanediamine, 1,12-octadecanediamine, bis(3-aminopropyl)sulfide, N-methyl-bis(3-aminopropyl)amine, hexamethylenediamine, heptamethylenediamine, nonamethylenediamine, decamethylenediamine, bis(3-aminopropyl) tetramethyldisiloxane, bis(4-aminobutyl)tetramethyldisiloxane, and the like.

In general, the reactions can be advantageously carried out employing well-known solvents, e.g., o-dichlorobenzene, m-cresol/toluene and the like to effect interaction between the bis(ether anhydride) (IX) and the diamines (X), at temperatures of from about 100° to about 250° C. Alternatively, the polyetherimides can be prepared by melt polymerization of any of the aforementioned dianhydrides (IX) with any of the aforementioned diamine (X) compounds while heating the mixture of the ingredients at elevated temperatures with concurrent intermixing. Generally, melt polymerization temperatures between about 200° to 400° C. and preferably 230° to 300° C. can be employed. Any order of addition of chain stoppers ordinarily employed in melt polymerization can be employed.

The conditions of the reaction and the proportions of ingredients can be varied widely depending on the desired molecular weight, intrinsic viscosity, and solvent resistance. In general, equimolar amounts of diamine (X) and dianhydride (IX) are employed for high molecular weight polyetherimides. However, in certain instances, a slight molar excess (about 1 to 5 mole percent) of diamine (X) can be employed resulting in the production of polyetherimides having terminal amine groups.

Generally, useful polyetherimides have an intrinsic viscosity [$\eta$] greater than 0.2 deciliters per gram, preferably 0.35 to 0.60, or 0.7 deciliters per gram measured in m-cresol at 25° C.

Included among the many methods of making the polyetherimides are those disclosed in U.S. Pat. Nos. 3,847,867; 3,847,869; 3,850,885; 3,852,242; and 3,855,178. These disclosures are incorporated herein in their entirety by reference for the purpose of teaching, by way of illustration, general and specific methods for preparing polyetherimides for use in the blends of this invention.

The blend compositions of the invention may be modified by the addition of other additives conventionally used in the art of plastics compounding, provided they do not render articles molded from the blend nonductile. Such additives can include fillers (such as clay or talc), supplementary delustrants, reinforcing agents (such as glass fibers), impact modifiers, antistats, plasticizers, flow promoters and other processing aids, stabilizers, colorants, mold release agents, ultraviolet screening agents, drip inhibitors such as polytetrafluoroethylene (PTFE), supplementary or synergistic flame retardants, and the like.

Preferred blend compositions of the invention include a flame retarding proportion of a silicone-polyimide copolymer resin. This particular flame retarding additive is particularly compatible with the blend of polyester carbonate and polyimide, described above, lessening the adverse effect one might expect, on other desired physical properties of the articles molded from the blend (such as heat distortion temperature, notched Izod strengths and the like).

The silicone-polyimide copolymers employed as fire-retarding additives in the preferred compositions of the invention are exemplified by resins containing recurring or repeating chain units of the formula (V) given above interrupted by polysiloxane units of the formula:

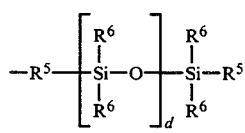

wherein each $R^5$ represents a divalent hydrocarbon radical having 1 to 14 carbon atoms; each $R^6$ is independently selected from monovalent hydrocarbon radicals having 1 to 14 carbon atoms; and d is an integer of from 4 to 40.

The silicone-polyimide resins described above are generally well-known compounds, which may be prepared by a number of known methods; see for example the procedures described in U.S. Pat. Nos. 4,690,997 and 4,808,686 incorporated herein by reference thereto. In general, the method of preparation may be by reaction between amino-terminated polydiorganosiloxanes of the formula:

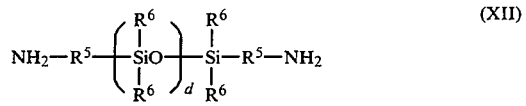

wherein $R^5$, $R^6$ and d have the meanings previously ascribed to them; and an organic diamine of the formula (X) given above; with a substantially equal molar proportion of an aromatic bisanhydride of the formula (IX) given above.

The amine-terminated polydiorganosiloxanes (XII) are also well-known compounds which may be prepared by the procedures described in the U.S. Pat. No. 3,185,719 (Prober) which is hereby incorporated herein by reference thereto.

Flame-retarding proportions of the silicone-polyimides employed in the preferred blends of the invention are relatively minor amounts, i.e.; less than about 5 parts by weight of the total blend composition. Preferably, a flame-retarding proportion is within the range of from about 1 to 3 parts by weight and most preferably about 2 parts.

The preferred silicone-polyimide resins for use in the present invention contain about 20 to 60 weight percent of siloxane units of the formula (XI) given above.

Additional embodiments of the invention include thermoplastic molding compositions containing minor proportions (less than 50 percent by weight) of polycarbonate homopolymers.

Polycarbonate homopolymer resins and their method of preparation by interfacial polymerization are well known; see for example the details provided in the U.S. Pat. Nos. 3,028,365; 3,334,154; 3,275,601; 3,915,926; 3,030,331; 3,169,121; 3,027,814; and 4,188,314, all of which are incorporated herein by reference thereto. In general, the method is as described above for preparing polyester-carbonates, but in the absence of an ester precursor.

Also included within the blends of the present invention is the presence as an additive, of minor proportions of high molecular weight thermoplastic randomly branched polycarbonates, polyestercarbonates and/or polyarylates. These randomly branched polymers are prepared by co-reacting a polyfunctional organic compound with the aforedescribed dihydric phenols, carbonate and/or ester precursors. The polyfunctional organic compounds useful in making the branched polycarbonates are set forth in U.S. Pat. Nos. 3,635,895 and 4,001,184 which are incorporated herein by reference. These polyfunctional compounds are generally aromatic and contain at least three functional groups which are carboxyl, carboxylic anhydrides, phenols, haloformyls or mixtures thereof. Some nonlimiting examples of these polyfunctional aromatic compounds include 1,1,1-tri(4-hydroxyphenyl) ethane, 1,3,5-tryhydroxybenzene, trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic dianhydride, and the like. The preferred polyfunctional aromatic compounds are 1,1,1-tri(4-hydroxyphenyl) ethane, trimellitic, anhydride or trimellitic acid or their haloformyl derivatives. Also included herein are blends of a linear polycarbonate and a branched polycarbonate.

As described above, the blends of the invention may contain a proportion of a polyarylate resin (c) as an ingredient. Preferably the proportion is such that the polyester-carbonate and polyacrylate together contribute from about 20 to about 80 weight percent of ester units (relative to carbonate units) to the blend composition.

In addition, the polyester-carbonate (a) together with any polyarylate resin (c) ingredient provide a weight percent ratio of moieties of the formulae (III) and (IV) given above, within the range of from 50:50 to 0:100.

Polyarylates are well known resins consisting of repeating carboxylic chain units as shown in the formula (II) given above. The polyarylate polymers, in general, are prepared by reacting an aromatic difunctional carboxylic acid or ester forming derivative thereof, and a dihydric phenol. Of course, polyarylates may be polymerized from a carboxylic acid/hydroxy functional monomer in a head-tail arrangement. The aromatic dicarboxylic acids and dihydric phenols described above for preparation of polyester-carbonates may be used in the preparation of polyarylate resins.

In a preferred polyarylate the difunctional carboxylic acid residue portion contains residues of terephthalic acid or mixtures of terephthalic acid and isophthalic acid. More preferably, such polyarylates contain residues of a mixture of from about 30 to about 70 mole percent terephthalic acid and from about 70 to about 30 mole percent of isophthalic acid. A polyarylate containing residues of a mixture of 50 mole percent of terephthalic acid and 50 mole percent isophthalic acid is common. In general, these and other suitable polyarylates have a reduced viscosity of from about 0.4 to about 1.0 g/100 ml as measured in p-chlorophenol at 49° C. The polyarylates employed in the present invention can be prepared by any of the well known prior art polyester forming reactions, such as the reaction of the acid chlorides of the aromatic dicarboxylic acids with the dihydric phenol, the reaction of the diaryl esters of the aromatic dicarboxylic acids with the dihydric phenols, and the reaction of the aromatic diacids with diester derivatives of dihydric phenol. These processes are described in, for example, U.S. Pat. Nos. 3,317,464; 3,948,856; 3,780,148; 3,824,213; 3,133,898; and 4,477,647; all of which are incorporated herein by reference thereto.

The production of the blend compositions of the invention is done by any of the blending operations known for the blending of thermoplastics, for example blending in a kneading machine such as a Banbury mixer or an extruder. The sequence of addition is not critical but all components should be thoroughly blended together. Blending can be done continuously or batchwise. Melt blending can also be employed.

The invention will be better understood with reference to the following preparations and examples, which are presented for purposes of illustration rather than for limitation, and which set forth the best mode contemplated for carrying out the invention.

The term "iso/tere" is used herein to mean the ratio by weight of isophthalic moieties of the formula (III) to terephthalic moieties of formula (IV) given above.

Where reported, the following test procedures were followed:

Heat Distortion Temperature Under Load (DTUL) of the molded samples was determined according to ASTM D-648.

Notched Izod (NI) impact on 125 mil and 250 mil thick molded samples were determined according to ASTM D-256.

Flexural Yield (FY) and Flexural Modulus (FM) were determined according to ASTM D-790.

Intrinsic Viscosity (I.V.)

The intrinsic viscosity was measured at a temperature of 25° C. in methylene chloride and is reported in deciliters/gram (dl/g).

Molecular Weight (Mw)

The weight average molecular weight (Mw) is determined by gel permeation chromatography (GPC) in methylene chloride relative to polycarbonate standards using a UV detector at 254 nm.

All parts are by weight unless otherwise stated.

Preparation 1

This preparation is of an aromatic polyester-carbonate resin. The preparation is not of a polyester-carbonate useful in the present invention, but is made for comparative purposes following the teachings of U.S. Pat. No. 4,430,484 (Example 1).

To a 38 liter reactor vessel there are added 8 liters of methylene chloride, 6 liters of water, 1,906 grams (8.36 moles) of bisphenol A, 20 milliliters of triethylamine, 4 grams of sodium gluconate, and 65 grams of p-tertiary butylphenol molecular weight regulator. At a pH of between about 9–10.5, 1,089.6 grams (5.37 moles) of a mixture of 15% by weight of isophthaloyl dichloride and 85% by weight of terephthaloyl dichloride in 2 liters of methylene chloride are added over a 10 minute interval while controlling the pH at about 9–10.5 with 35% aqueous caustic. After the addition of the diacid chloride mixture, phosgene is added at a rate of 36 grams per minute for 12 minutes while controlling the pH at about 10–11 with 35% aqueous caustic. The polymer mixture is diluted with 5 liters of methylene chloride and the brine phase is separated by centrifuge. The resulting polymer phase is washed with aqueous acid and water and is then recovered by high pressure steam precipitation to yield a white powder having an Intrinsic Viscosity of 0.5 dl/g in methylene chloride at 25° C. To this resin powder is added a minor amount (about 0.1 parts by weight per hundred parts by weight of resin) of a stabilizer mixture containing a phosphite color stabilizer and an epoxy stabilizer. This resin product is then fed to an extruder operating at a temperature of about 316° C. to extrude the resin into strands and the extruded strands are chopped into pellets. The pellets are then injection molded at about 340° C. into test samples measuring 6.35 cm × 1.27 cm × 0.317 cm..

The results of the testing are reported in the Table, below.

Preparations 2–5

The general procedure of Preparation 1, supra., is repeated a plurality of times, except that the proportions of isophthaloyl and terephthaloyl dichlorides as used therein were modified. The proportions used and the test results observed are set forth in the Table, below.

EXAMPLES 1–6

In a series of runs, each of the polyester-carbonate resins prepared according to Preparations 1–6, supra. were blended with 0.1 percent by weight of the blend of an antioxidant (Irgafos®168; Ciba-Geigy Corp.), 2.0 percent by weight of titanium dioxide, and various proportions of a polyetherimide (Ultem®1000 grade of polyetherimide, General Electric Co., Pittsfield, Mass.) and a siloxane-polyetherimide copolymer prepared by the polymerization of 1 equivalent of 2,2-bis[4-(3,4-dicarboxyphenoxy)phenyl] propane dianhydride with 0.65 equivalents of meta-phenylenediamine and 0.35 equivalents of bis-gamma-aminopropyl polydimethyl siloxane, a polymer of the formula (XII) given above wherein d is an average of 10; Siltem®, General Electric Co., Pittsfield, Mass., U.S.A. The blend was then fed to an extruder at a temperature of about 340° C. to extrude the blend into strands. The strands were chopped into pellets and injection molded into test samples measuring 6.35 cm×1.27 cm ×0.317 cm. The samples were tested for physical properties. The composition of each blend and the test results are set forth in the Table, I, below.

TABLE I

| Blend Composition (wgt %) | | | Polyester-Carbonate (PPC) Composition | | | Notched Izod | | DTUL (°C) |
|---|---|---|---|---|---|---|---|---|
| ULTEM® | SILTEM® | PPC | % Ester (weight) | Iso/Tere (ratio) | I.V. | J/m | mode of failure | 18 Kg/cm² |
| 50 | 0 | 50 | 72 | 85/1 | 0.5 | 107 | brittle | 171 |
| 21.5 | 2.4 | 74 | 80 | 93/7 | 0.478 | 133 | brittle | 165 |
| 21.5 | 2.4 | 74 | 40 | 50/50 | 0.56 | 539 | ductile | |
| 21.5 | 2.4 | 74 | 44 | 0/100 | 0.649 | 694 | ductile | |
| 21.5 | 2.4 | 74 | 43 | 0/100 | | 592 | ductile | 160 |
| 21.5 | 2.4 | 74 | 48 | 0/100 | | 539 | ductile | 162 |

EXAMPLES 7-11

To determine the effect of the isophthaloyl and terephthaloyl reactant weight ratios on ductility and notched Izod impact strengths, two polyester-carbonate resins were prepared following the general procedure of Preparations 1-5, supra but with different proportions (weight ratios) of the two aromatic dichlorides. The two polyester-carbonate resins, identified herein as PPC resin A and PPC resin B had 80 percent by weight of ester units. The two resins PPC-A and PPC-B were then blended with each other in varying proportions and with 23 parts by weight of the polyetherimide (Ultem® 1000, supra.) described above and 0.01 parts of the antioxidant Irgafos®, supra. The blend was extruded into strands, chopped into pellets and injection molded into test samples as described in Preparation 1, supra. The Examples 7-9 are not examples of the invention, having iso/tere weight ratios outside the scope of the invention. the Examples 10-11 are examples of the invention. The isophthalic/terephthalic weight ratio (iso/tere) of each sample and the physical test results are set forth in Table II, below.

TABLE II

| | Effect Of Iso/Tere Ratio On Blend | | | | |
|---|---|---|---|---|---|
| Example No. | 7 Control | 8 Control | 9 Control | 10 Control | 11 |
| Composition | | | | | |
| PPC (A.) | 76.99 | 57.66 | 38.50 | 19.25 | 00.00 |
| PPC (B.) | 00.00 | 19.25 | 38.50 | 57.66 | 76.99 |
| ULTEM® 1000 | 23.00 | 23.00 | 23.00 | 23.00 | 23.00 |
| Irgafos® 168 | 00.01 | 00.01 | 00.01 | 00.01 | 00.01 |
| Iso/Tere Wgt. Ratio In Blend | 93/7 | 82/18 | 72/28 | 61/39 | 50/50 |
| Test Properties Notched Izod J/m | | | | | |
| 125 mil | 101 | 149 | 187 | 294 | 363 |
| 250 mil | 91 | 107 | 123 | 149 | 188 |

A. PPC = 93/7 Iso/Tere weight ratio, 80% by weight ester units.
B. PPC = 50/50 Iso/Tere weight ratio, 80% by weight ester units.

As can be seen from Table II above, the lower the iso/tere weight ratio (see Examples 10-11) the higher the ductility in comparison to the higher weight ratio used in Examples 7-9.

EXAMPLES 12-13

The PPC resin A and the PPC resin B used in Examples 7-11, supra. were blended with a polyetherimide (Ultem® 1000, supra. and 0.08 parts by weight of the anti-oxidant Irgafos ®-168, supra. To this blend there was also added 19.36 parts by weight of a polycarbonate, the phosgenation product of bisphenol-A (Lexan®105; General Electric Co., Mount Vernon, Indiana). Extruded, chopped, pelletized and injection molded as described in Example 1, supra. the test samples were tested for physical properties. The test results, shown in comparison to those obtained in Examples 7 (Control) and 11 (invention), are set forth in the Table III, below. The Example 12 is not an example of the invention, having an iso/tere weight ratio outside of the scope of the invention and is presented for comparative purposes with Example 13, an example of the present invention.

TABLE III

| | 7 (Control) | 11 (Invention) | 12 (Control) | 13 (Invention) |
|---|---|---|---|---|
| Blend Composition: | | | | |
| PPC* (A.) | 76.99 | | 58.06 | |
| PPC* (B.) | | 76.99 | | 58.06 |
| LX105** | | | 19.36 | 19.36 |
| ULTEM® 1000, supra | 23 | 23 | 22.5 | 22.5 |
| Irgafos® 168, supra | 0.01 | 0.01 | 0.08 | 0.08 |
| Av. Ester Content (wgt. %) | 80 | 80 | 60 | 60 |
| Iso/Tere Wgt. Ratio In PPC | 93/7 | 50/50 | 93/7 | 50/50 |
| Test Results Notched Izod (J/m) | | | | |
| 125 mil | 101 | 363 | 160 | 427 |

TABLE III-continued

| | 7 (Control) | 11 (Invention) | 12 (Control) | 13 (Invention) |
|---|---|---|---|---|
| 250 mil | 91 | 188 | 107 | 213 | a. PPC -A = 93/7 Iso/Tere Ratio at 80% Ester. PPC -B = 50/50 Iso/Tere Ratio at 80% Ester.
*PPC = Polyester-carbonate
**LX105 = a polycarbonate homopolymer prepared by phosgenation of bisphenol-A, $M_W$ of 30,300; General Electric Co., Mt. Vernon, In.

As shown in Table III, above, blends containing polyester-carbonate with a low iso/tere weight ratio (50/50) give the best ductility (Example 13). The ductility of these blends can be increased by decreasing the ester content (by increasing the polycarbonate concentration; Example 13 versus Example 11). Blends containing polyester-carbonate with high iso/tere weight ratio (93/7) afford the worst ductility (Examples 7 and 12). The ductility of these blends can be increased also by decreasing the ester bond content, but the blends are still relatively brittle (Example 12 versus Example 7).

EXAMPLES 14-17

Various proportions of a polyarylate resin were blended with a polycarbonate homopolymer resin, 22.4 parts of a polyetherimide (Ultem® 1000, supra and 0.1 parts of the anti-oxidant Irgafas® 168, supra. The blend was extruded, pelletized and injection molded as described in Preparation 1, supra. Example 14 is not an example of the invention, having 100 weight percent of ester bonds, and is presented for purposes of comparison only. Examples 15-17 illustrate the invention. When tested, the results were as shown in Table IV, below.

TABLE IV

| | Polycarbonate/Polyarylate/Polyetherimide Blends | | | |
|---|---|---|---|---|
| Example No. | 14 Control | 15 | 16 | 17 |
| Composition | | | | |
| Ardel ® D170 (a.) | 77.5 | 62.0 | 46.5 | 31.0 |
| Lexan ® 130 (b) | 00.0 | 15.5 | 31.0 | 46.5 |
| ULTEM ® 1000, Supra | 22.4 | 22.4 | 22.4 | 22.4 |
| Irgafos ® 168, Supra | 0.1 | 0.1 | 0.1 | 0.1 |
| Ester Content (Wgt. %) | 100 | 80 | 60 | 40 |
| Test Properties Notched Izod (J/m) | | | | |
| 125 mil | 112 | 160 | 176 | 188 |
| 250 mil | 16 | 37 | 112 | 117 |

(a.) Polyarylate (100% ester, iso/tere weight ratio = 50/50) The product of reacting bisphenol-A with terephthalic and isophthalic acids, $M_W$ 25,500; Amoco Chemical Corp., Chicago, Illinois.
(b.) Polycarbonate product of phosgenation of bisphenol-A, $M_W$ 36,300; General Electric Co., Mount Vernon, Indiana.

Table IV shows that as the ester content of the polyester-carbonate phase decreases, the ductility of the overall blend increases.

Thus, according to the invention the polyester-carbonate phase can be described as compositions with an average ester content and average iso/tere ratio that can be derived from a pure copolymer, or a blend of polyester-carbonates; polycarbonate and polyester-carbonates; polyarylate; or polyester-carbonates and a polyarylate.

What is claimed is:

1. A thermoplastic molding composition for molding ductile articles, consisting essentially of a ductile blend of (a) from about 75 to 95 parts by weight of a polyester-carbonate resin containing recurring polycarbonate chain units of the formula:

wherein D is a divalent aromatic radical of the dihydric phenol employed in the resin preparation; and repeating or recurring carboxylic chain units of the formula:

wherein D has the meaning previously ascribed to it and R is a divalent moiety selected from those of the formulae:

or

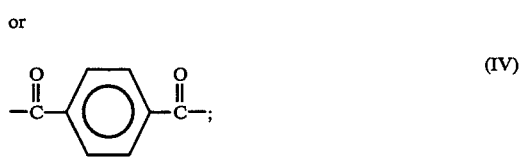

and
(b) from about 5 to 25 parts by weight of a polyetherimide resin having repeating chain units of the formula:

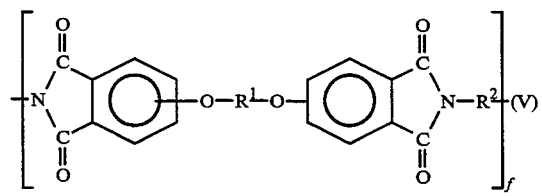

wherein f is an integer of from about 10 to about 500; $R^2$ represents a divalent aliphatic hydrocarbon radical containing from 2 to about 12 carbon atoms, a divalent aromatic hydrocarbon of 6 to 20 carbon atoms, a halogenated hydrocarbon radical containing from 6 to 18 carbon atoms, or a divalent cycloaliphatic hydrocarbon radical containing from 3 to about 10 carbon atoms; and $R^1$ is a divalent aromatic organic radical having from 6 to 30 carbon atoms, inclusive, wherein the amounts of (A) and (B) are based on the combined weight of (A)+(B) and, optionally (C) less than 50% by weight of an aromatic polycarbonate homopolymer wherein the amount of (C) is based on the combined weight of (A)+(B)+(C) and/or (D) an effective amount for fire retardation of a fire retardant;

and wherein the blend of (A)+(B) has an average of about 20 to 80 weight percent of ester units of the formulae (III) and (IV) together; and said moieties (III) and (IV) in the blend being in a weight ratio of from about 50:50 to 0:100, and wherein the ductility of said blend is sufficient to exhibit a notched izod impact strength of at least about 363 J/M at 125 mil thickness.

2. The composition of claim 1 wherein $R^1$ is selected from the group consisting of aromatic hydrocarbon radicals; halogenated aromatic hydrocarbon radicals; and radicals of the formula:

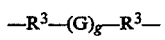

wherein $R^3$ is a divalent radical having from 6–13 carbon atoms, inclusive, selected from hydrocarbon radicals and halogenated hydrocarbon radicals; g is 0 or 1 and G is a divalent radical selected from those of the formula:

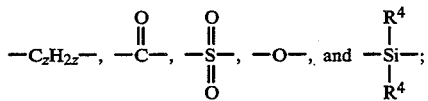

wherein z is an integer of from 1–5, and $R^4$ is a monovalent alkyl, aryl, alkaryl or aralkyl radical.

3. The composition of claim 2 wherein $R^1$ is the divalent moiety of the formula:

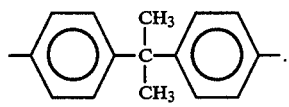

4. The composition of claim 3 wherein the aromatic polyester-carbonate is a copolymer resulting from the condensation of bisphenol A with terephthaloyl dichloride and phosgene.

5. The composition of claim 1 wherein the fire retardant is a silicone-polyetherimide copolymer containing recurring or repeating chain units of the formula:

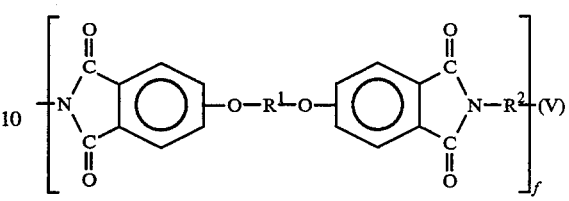

wherein f is an integer of from about 10 to about 500; $R^2$ represents a divalent aliphatic hydrocarbon radical containing from 2 to about 12 carbon atoms, inclusive, a divalent aromatic hydrocarbon of 6 to 20 carbon atoms, a halogenated hydrocarbon radical containing from 6 to 18 carbon atoms, or a divalent cycloaliphatic hydrocarbon radical containing from 3 to about 10 carbon atoms; and $R^1$ is a divalent aromatic radical having from 6 to 30 carbon atoms interrupted by polysiloxane units of the formula:

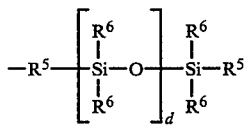

wherein each $R^5$ represents a divalent hydrocarbon radical having 1 to 14 carbon atoms; each $R^6$ is independently selected from monovalent hydrocarbon radicals having 1 to 14 carbon atoms; and d is an integer of from 4 to 40.

6. The composition of claim 1 wherein the weight percentage of ester units of the formulae (III) and (IV) is within the range of from about 40 to 80.

7. The composition of claim 1, wherein the ductility of said blend is sufficient to exhibit a notched izod impact strength of at least about 427 J/m at 125 mil thickness.

8. An article thermoplastically molded from the composition of claim 1.

* * * * *